United States Patent
Lee

(10) Patent No.: US 11,009,159 B2
(45) Date of Patent: May 18, 2021

(54) VISUAL AND TACTILE LATCH INDICATOR FOR A FUEL SYSTEM COUPLING

(71) Applicant: Adel Wiggins Group, a Division of Transdigm Inc., Los Angeles, CA (US)

(72) Inventor: Beng Poh Lee, Cerritos, CA (US)

(73) Assignee: AdelWiggins Group, a Division of Transdigm, Inc., Los Angeles, CA (US)

( * ) Notice: Subject to any disclaimer, the term of this patent is extended or adjusted under 35 U.S.C. 154(b) by 655 days.

(21) Appl. No.: 15/719,116

(22) Filed: Sep. 28, 2017

(65) Prior Publication Data

US 2019/0093801 A1 Mar. 28, 2019

(51) Int. Cl.
*F16L 21/06* (2006.01)
*F16L 21/00* (2006.01)
*F16L 37/20* (2006.01)

(52) U.S. Cl.
CPC .............. *F16L 21/06* (2013.01); *F16L 21/002* (2013.01); *F16L 37/20* (2013.01); *F16L 2201/10* (2013.01)

(58) Field of Classification Search
CPC .. E05B 15/0086; E05B 65/0817; E05B 41/00; E05C 19/14; Y10S 292/49; Y10T 292/20; Y10T 292/205; Y10T 292/216; Y10T 292/40; F16L 21/007; F16L 21/06; F16L 2201/10; F16L 21/002; F16L 37/20; F16L 21/08; F16L 37/12; F16L 37/122; F16L 37/123; F16L 37/127; F16L 37/1205; F16L 37/121
USPC .......... 292/256, 256.6, 256.69, DIG. 49, 299
See application file for complete search history.

(56) References Cited

U.S. PATENT DOCUMENTS

| | | | | |
|---|---|---|---|---|
| 2,133,558 A | * | 10/1938 | Miller | F16L 37/20 285/311 |
| 2,643,138 A | * | 6/1953 | Jacobs | F16L 37/16 285/5 |
| 4,181,333 A | * | 1/1980 | Stelma | E05C 19/14 292/113 |
| 4,249,786 A | * | 2/1981 | Mahoff | F16L 27/127 439/192 |
| 5,129,683 A | * | 7/1992 | Brief | F16L 37/098 285/320 |
| 5,628,531 A | * | 5/1997 | Rosenberg | F16L 37/0985 285/319 |

(Continued)

FOREIGN PATENT DOCUMENTS

| | | | | |
|---|---|---|---|---|
| DE | 1096245 B | * | 12/1960 | E05C 19/14 |
| DE | 102014106709 B3 | * | 12/2014 | F16L 37/101 |
| DE | 102017208643 A1 | * | 11/2018 | F16L 37/0985 |

OTHER PUBLICATIONS

Machine Translation of DE 1096245, 2020, pp. 1-5 (Year: 2020).*

*Primary Examiner* — Christine M Mills
(74) *Attorney, Agent, or Firm* — Fulwider Patton LLP

(57) ABSTRACT

A closure indicator for a fluid coupling is disclosed where the fluid coupling has first and second semi-circular members hinged together at a first end and latched together at the opposite end, the indicator comprising an upper surface including a stop on a rear surface for arresting rotational travel in a first direction, first and second sidewalls with elongate slots, a spring biasing the indicator in the first direction, and first and second arms extending from said first and second sidewalls, respectively, to a position under a pin of a bracket only when the members are latched together.

2 Claims, 5 Drawing Sheets

(56) References Cited

U.S. PATENT DOCUMENTS

| | | | |
|---|---|---|---|
| 6,880,859 B2 * | 4/2005 | Breay | F16L 21/06 |
| | | | 285/1 |
| 6,971,682 B2 * | 12/2005 | Hoang | F16L 39/005 |
| | | | 285/123.12 |
| 7,226,092 B2 * | 6/2007 | Anzai | E05C 19/14 |
| | | | 292/247 |
| 7,540,364 B2 * | 6/2009 | Sanderson | A45C 13/1084 |
| | | | 190/119 |
| 8,075,024 B2 * | 12/2011 | Wern | F16L 25/01 |
| | | | 285/373 |
| 9,261,211 B2 * | 2/2016 | Schooley | F16L 23/06 |
| 2008/0315576 A1 * | 12/2008 | Moretti | F16L 37/0885 |
| | | | 285/82 |
| 2009/0096209 A1 * | 4/2009 | Zilch | F16L 25/01 |
| | | | 285/80 |
| 2018/0135786 A1 * | 5/2018 | Bourbon | F16L 23/04 |

* cited by examiner

VISUAL AND TACTILE LATCH INDICATOR FOR A FUEL SYSTEM COUPLING

BACKGROUND

The present invention relates to fluid couplings, and more particularly to a safety feature whereby a clamping mechanism is equipped with a visual and tactile indicator that verifies the closure of the clamp.

Couplings that connect two conduits for communicating fluids are known in the art, particularly in the aerospace, automotive, and industrial fields. FIG. 1 illustrates a particular coupling used in such environments and offered by Adel Wiggins Group of Los Angeles, Calif., assignee of the present invention. The coupling shown is ubiquitous on aircraft fuel systems and is comprised of two semi-circular members that are hinged together at a first location to enable the coupling to pivot open for receiving a conduit or tubing. Once the tubing or tubings is/are received in the coupling, a clamping mechanism comprising three to four latches are rotated closed to tighten the coupling about the tubing(s). The latches are arranged so that adjacent latches are mounted on opposite ends of the respective opposed ends of the mating members and rotate closed in opposite directions to provide a more secure locking arrangement for the clamping mechanism.

Sometimes the clamping mechanism may not latch properly, preventing the coupling from fully closing. This can lead to an undesirable loss of the coupling function, particularly on high performance applications such as aircraft or other aerospace applications.

SUMMARY OF THE INVENTION

The present invention is an indicator for the clamping mechanism that provides both visual and tactile confirmation that the latches are locked or unlocked, minimizing the opportunity for a release of the coupling due to a misapplied or insecure clamping mechanism. The indicator is a spring actuated cover having first and second peripheral slots for translational and rotational movement about a pin on the clamping mechanism. A pair of rearwardly projecting tabs are positioned so as to arrest rotation of the indicator beyond a designated position, abutting one or more latches or the supporting structure beyond a specific rotation. Horizontally projecting arms extend below and are retained by a pin on the clamping mechanism when the latches are fully locked, fixing the indicator in a closed position against the bias of a torsional and compression spring. The indicator cannot be retained in the closed position unless the latches are locked, and the retention of the tabs beneath the pin of the clamping mechanism releases the biasing force of the spring and provides a user with both visual and tactile feedback as to the status of the clamping mechanism of the coupling.

These and other features of the invention will best be understood with reference to the detailed description of the preferred embodiments along with the accompanying figures.

DETAILED DESCRIPTION OF THE PREFERRED EMBODIMENTS

Figure 1A:
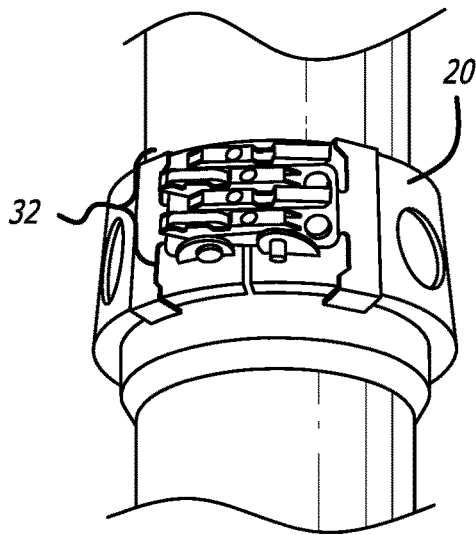
FIG. 1A is an elevated perspective view of a prior art coupling for use with the present invention.
Figure 1B:
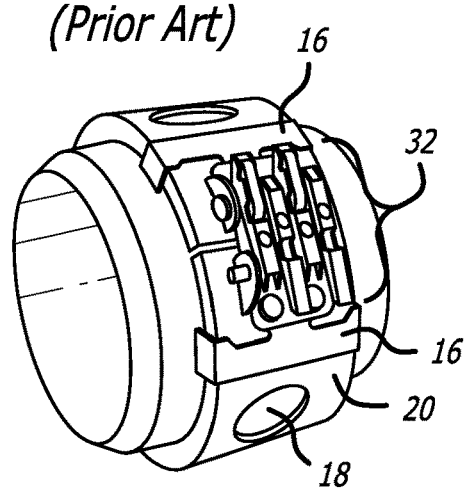
FIG. 1B is another elevated perspective view of the prior art coupling of FIG. 1A.
Figure 2:
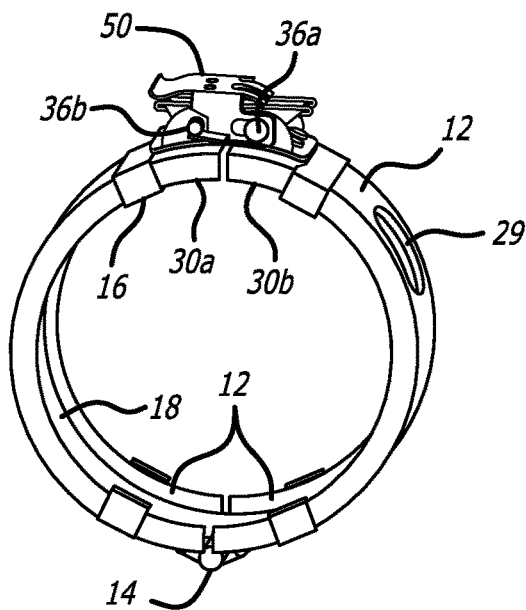
FIG. 2 is an elevated, perspective view of a tubular coupling with the indicator of the present invention mounted thereon in the closed position.
Figure 3:
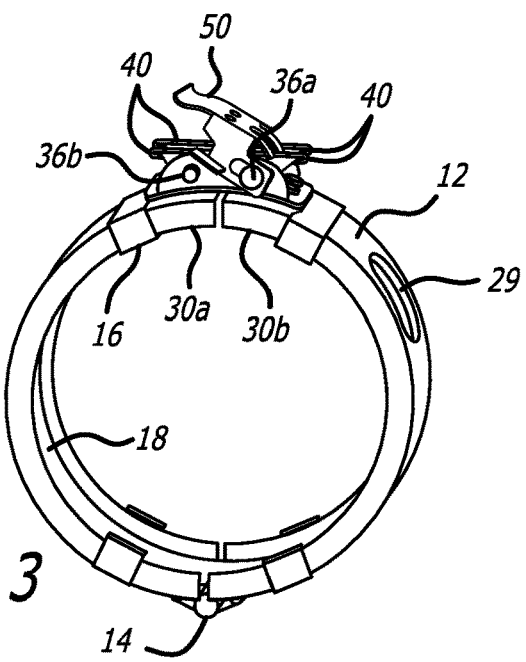
FIG. 3 is an elevated, perspective view of the tubular coupling with the indicator of the present invention mounted thereon in the open position.
Figure 4:
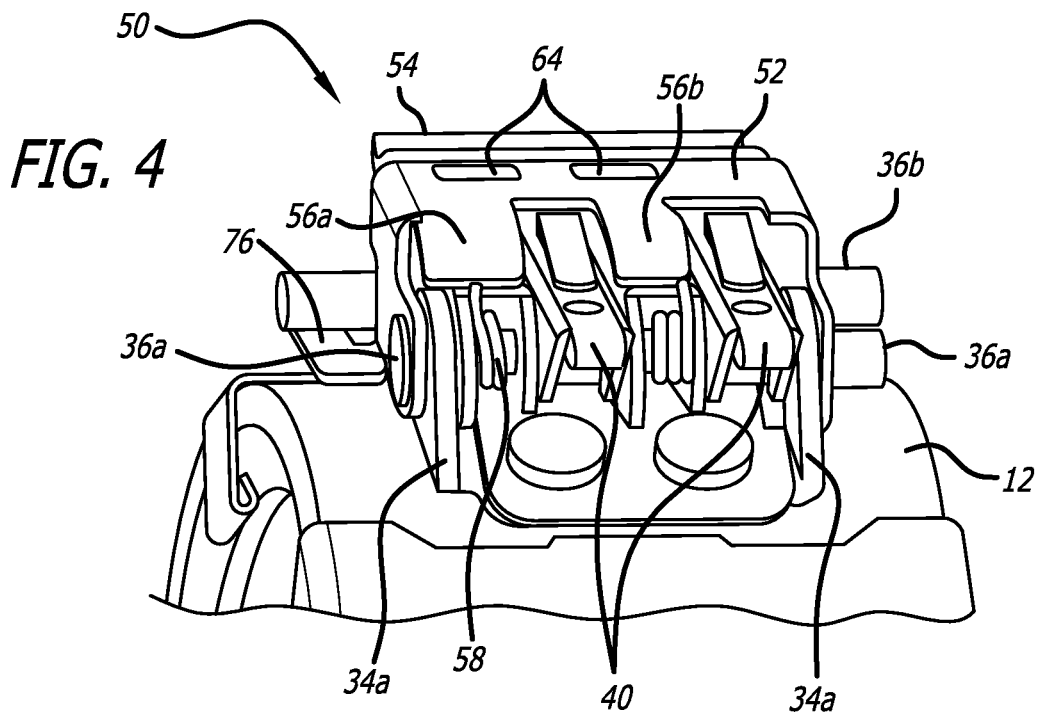
FIG. 4 is an enlarged perspective view of the rear of the indicator mounted on the coupling.

FIGS. 2 and 3 illustrate a fluid coupling 20 of the type having first and second semi-circular members 12 hinged together at a first location by a hinge 14, and a plurality of bonding device 16 mounted on each of the members 12. The coupling 20 also includes an inner sleeve 18 enclosed by the two semi-circular members 12. The lightening holes 29 are part of the semi-circular members 12. They serve as a visual check to ensure that sleeve 18 is installed in the coupling 20 and also help to reduce the weight of coupling 20. On opposed ends 30a,b of the members 12, a clamping mechanism 32 as shown in FIGS. 1A and 1B is mounted for adjoining the free ends of the members 12 into an annular coupling 20. The clamping mechanism 32 is formed by respective brackets 34, as shown in FIG. 4, affixed by rivets to the ends 30a,b where the brackets 34 each have first and second apertures through which a pin 36a,b is disposed, one on each bracket. In a four latch system, each pin 36a,b journals two latches 40. When the first and second semi-circular members 12 are brought together at the opposed ends 30a,b, pivoted by hinge 14, the latches capture pins 36a,b. That is, when the coupling 20 is formed in a continuous circle, the respective latches 40 on each bracket close and lock onto the opposite pin in alternate fashion to close and lock the coupling onto one or more conduits as shown in FIG. 1.

Disposed over the clamping mechanism is a novel status indicator 50 that can provide both visual and tactile feedback on the condition of the latches, specifically whether the latches are fully in the locked position. The indicator 50 pivots about pin 36a on the bracket and includes two tabs 76 that tuck below the opposite pin 36b on the other bracket when the clamping mechanism is closed, establishing that the coupling is properly secured for operation. If the clamping mechanism is not fully closed, the two tabs 76 cannot be tucked under the opposite pin 36b and the indicator 50 will rotate upward by virtue of a spring biased force, alerting the user to the fact that the coupling is not closed and will not secure the conduit(s) therein.

Figure 5:
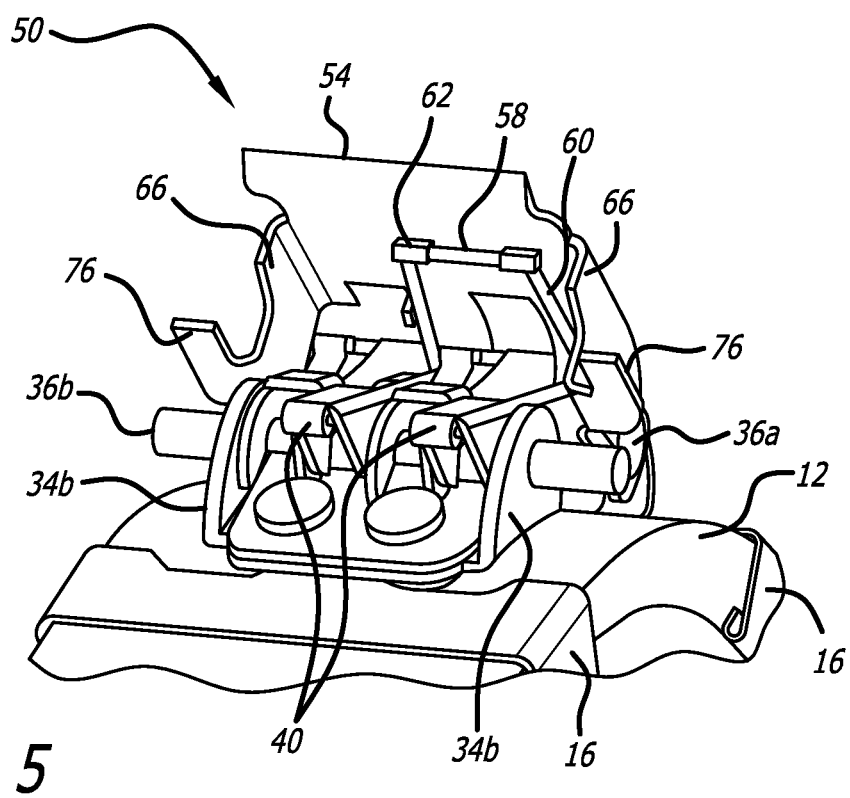
FIG. 5 is an enlarged perspective view of the front of the indicator mounted on the coupling.
Figure 7:
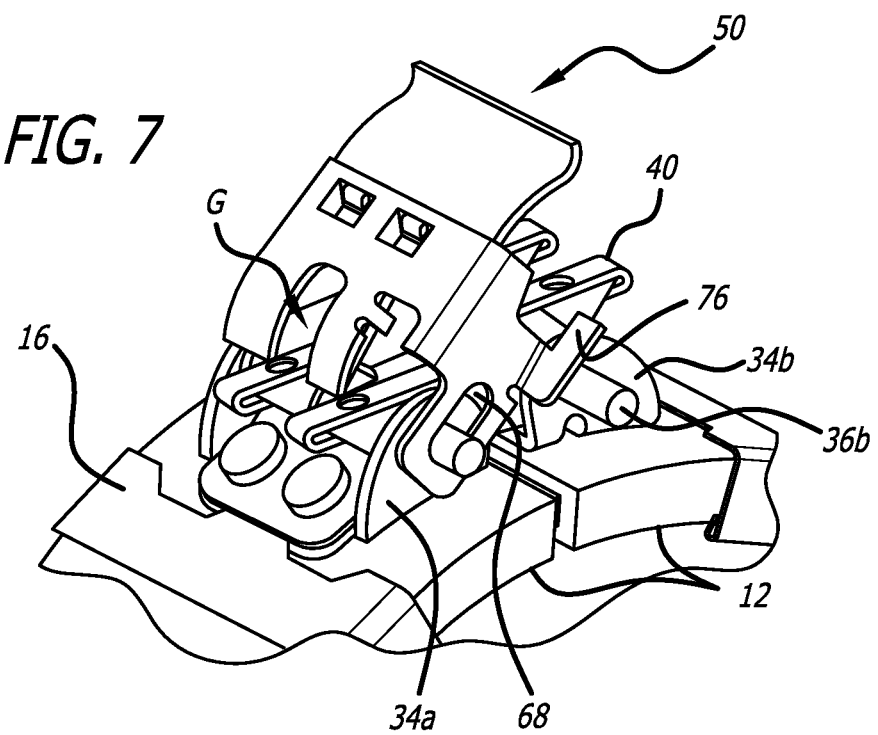
Figure 8:
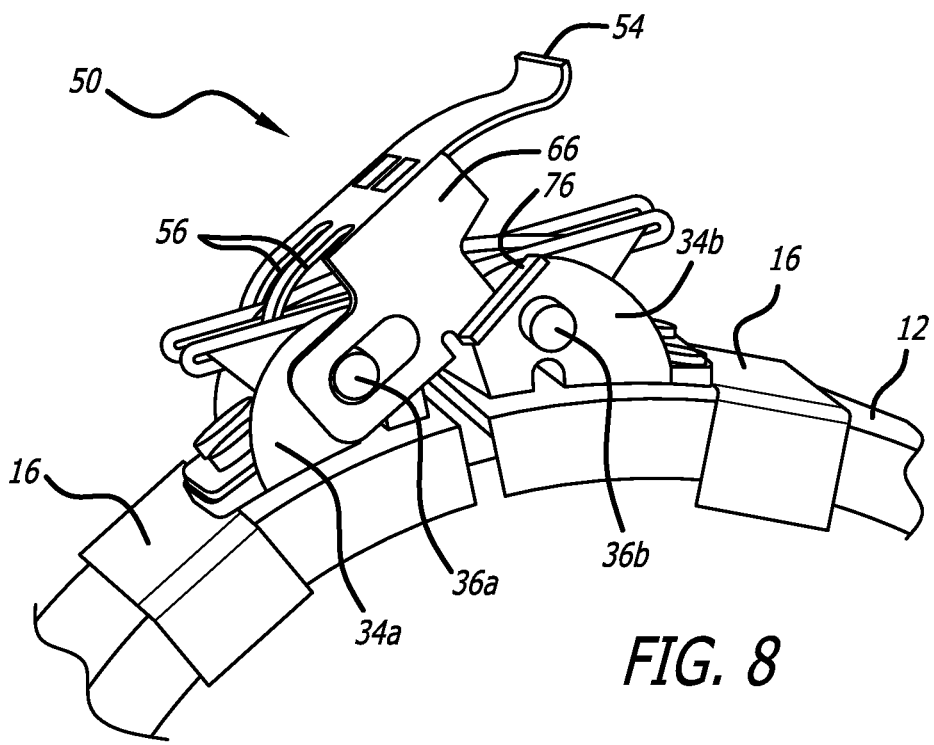
FIGS. 8-11 are enlarged, perspective views of the indicator transitioning sequentially from the open to the closed position.

FIG. 4 illustrates the indicator 50 mounted on the clamping mechanism: the two tabs 76 are under pin 36b. FIG. 5 illustrates the indicator 50 at the unlatched position: the two tabs 76 are above the pin 36b. The indicator comprises a substantially flat upper surface 52 having a curled front edge 54 and two rearwardly projecting rectangular tabs 56a,b. The rectangular tabs 56a,b are spaced apart by a gap equal to approximately the width of an individual latch 40 so that the indicator 50 may straddle one of the latches in the gap G, as shown in FIG. 7, between the tabs 56a,b. The substantially flat upper surface 52, curled front edge 54, and rearwardly projecting rectangular tabs 56 may be formed from a common sheet of material such as aluminum or plastic, molded or punched to the desired shape. First and second downwardly extending sidewalls 66 link the upper surface 52 to a headed pin 36a on bracket 34a via elongate slots 68 in the sidewalls having a diameter sized to receive the pin 36a in a sliding relationship, such that the indicator 50 when seated such that the pin 36a bears against the end of the slots 68 may pivot about the pin 36a. The slots 68 are formed such that the indicator may rotate and translate within the slots.

Figure 6:
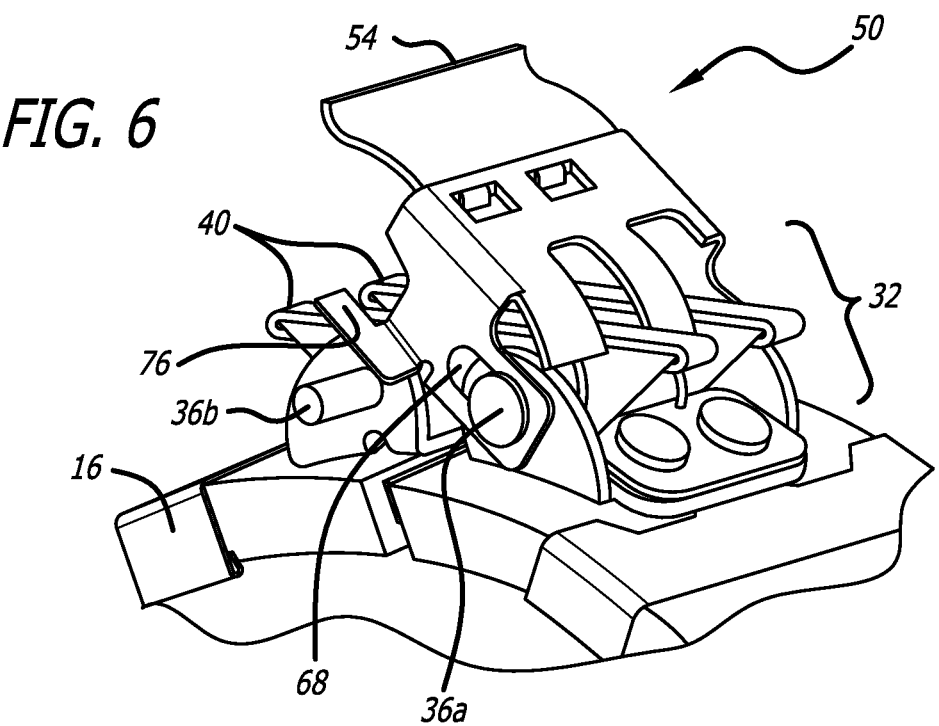
FIGS. 6 and 7 are enlarged, elevated perspective views of the indicator in the open configuration.

To pivot the indicator about headed pin 36a, a torsion and compression spring 58 is provided that is wound around the pin 36a at its periphery and includes a central loop 60 that is held against an underside of the flat upper surface 52 of the indicator 50 and the upper surface of the semi-circular members 12 underneath the two latches 40 that were installed onto the headed pin 36a. The central loop 60 is secured to the indicator with tabs 62 formed by cut-outs 64 shaped to grasp the central portion of the torsional and compression spring 58 as the spring biases the indicator with a compression load between the tabs 62 and the headed pin 36a. The torque applied by the torsional and compression spring 58 is sufficient to rotate the indicator about the pin 36a until the tabs 56a bear against bracket 34 (or tab 56b bears against the center latch) below the indicator 50 (see FIGS. 6 and 7). This causes the indicator 50 to tilt angularly away from the clamping mechanism 32 and clearly visually indicate that the indicator has not been placed in the closed position.

Figure 9:
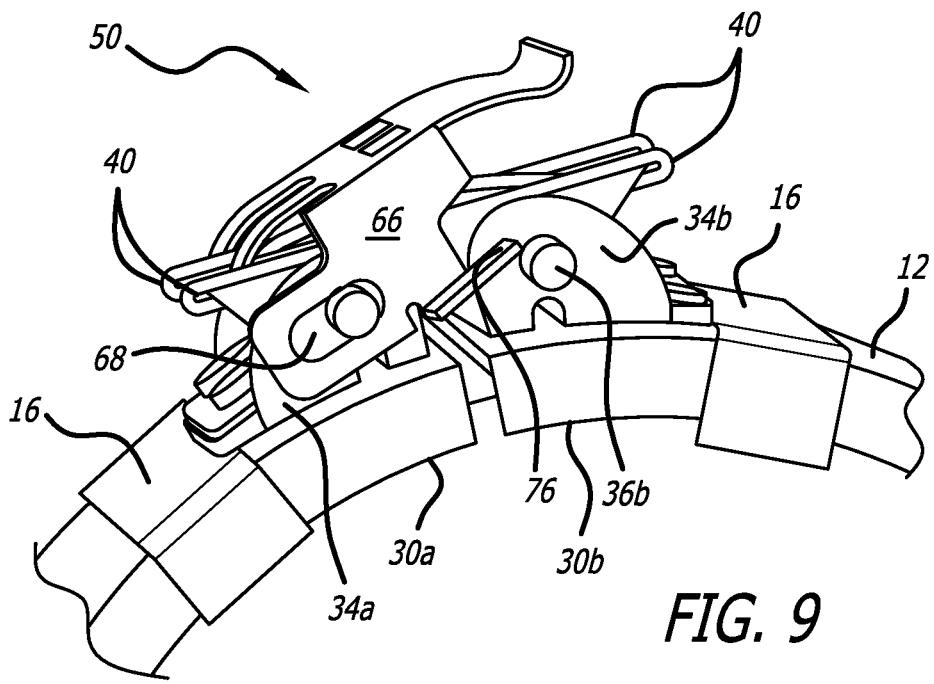
Figure 10:
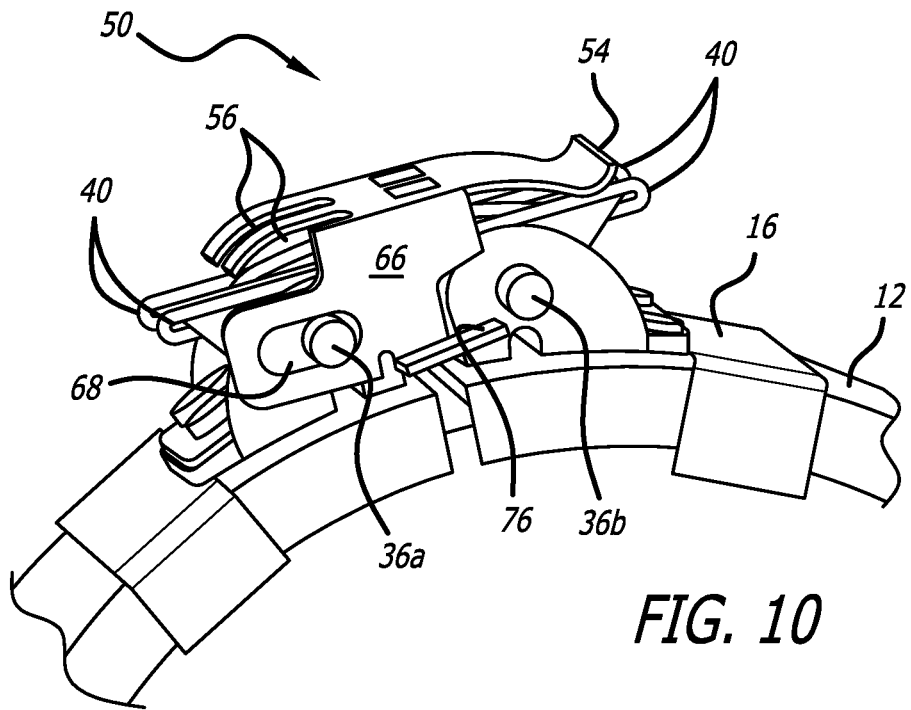
Figure 11:
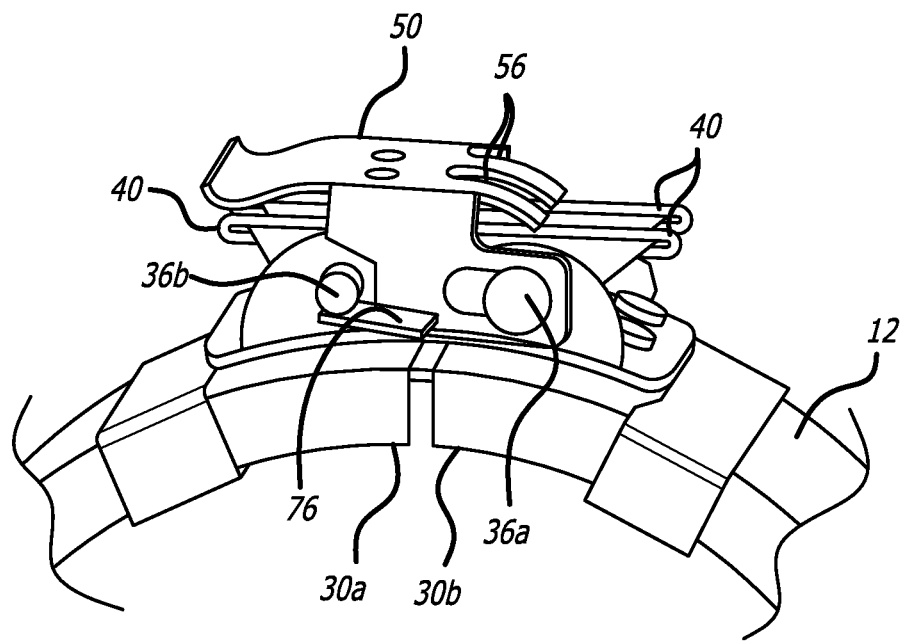

FIGS. 8-11 illustrate the closing sequence of the indicator 50 to visually and tactilely verify that the clamping mechanism is closed. The indicator 50 can rotate about pin 36a within slots 68, and with a thumb or forefinger the curled front edge 54 of the upper surface 52 can be rotated and translated downward against the bias of the torsion and compression spring 58 from the position in FIG. 8 through the position in FIG. 9 (rotation) to the position in FIG. 10 (compression and translation). As the indicator is rotated downward, the indicator is stopped by the tabs 76 on the pin 36b due to the interference between the two. A compression load will have to be asserted on the edge 54 using a thumb or forefinger to overcome the interference of tabs 76 and pin 36b as shown in FIG. 9. This translation of the indicator 50 within the slots 68 provides clearance so that a pair of arms 76 attached to the bottom of the sidewalls 66 and depend therefrom in a forward direction can pass in front of the pin 36b on the opposite bracket 34b. Pin 36b is secured by crimping on both ends. The crimp is located next to the side face of the bracket 34b. The crimps are small enough to secure the pin from sliding and at the same time they do not interfere with the inner edges of the tabs 76 during the latching of the indicator. At this point, the upper surface 52 is parallel with the upper surfaces of the latches 40 on the clamping mechanism 32, and the lower surface of the curled front edge 54 may bear against the upper surface of the latches as shown in FIG. 10. Once the arms 76 have cleared the pin 36b (FIG. 10), the indicator 50 is slid forward so that the arms 76 reside below the pin 36b as shown in FIG. 11 and the pin 36a is at the rearmost portion of the slot 68. The torsional and compression spring 58 applies a rotational force on the indicator 50, but the presents of the pin 36b and its contact with the arm 76 prevents the rotation of the indicator. As long as the clamping mechanism is securely closed, the indicator will maintain the position of FIG. 11 and cannot open, and a user will be able to appreciate from viewing the indicator that the coupling must be securely engaged if the indicator is in the closed position.

As stated, only when the coupling's latches are engaged will the brackets on opposite ends of the coupling be in proximity such that the indicator can close. Otherwise, the arms 76 will not pass under the pin 36b and the spring will rotate the indicator open. Further, the latches if open will not provide a flat surface from which the indicator may approach the pins of the brackets to achieve the closure position. Conversely, the latches cannot open while the indicator is in the closed position. In this manner, the indicator provides both a visual (the observation of the closure position) plus a tactile (the feel of the indicator unable to rotate freely when compressed) that provides feedback to the user that the coupling is secure.

While a particular preferred embodiment of the invention has been described, those skilled in the art will recognize that various modifications and substitutions to the foregoing description of the preferred embodiments may be made without departing from the scope of the invention as defined by the appended claims.

I claim:

1. A cylindrical fluid coupling, comprising:
  first and second semi-cylindrical members connected with a hinge, the first and second semi-cylindrical members each including at an end opposite the hinge cooperating portions of a locking mechanism mounted to a bracket, each bracket supporting a respective longitudinally aligned pin;
  a sleeve disposed within the first and second semi-cylindrical members; and
  a closure indicator mounted on the first semi-cylindrical member and engageable with the second semi-circular member, the closure indicator comprising:
    a top plate having an upper surface and a lower surface, and first and second spaced apart sidewalls depending from the lower surface of the top plate, the first and second sidewalls each formed with an elongate slot receiving the pin of the bracket of the first semi-cylindrical member such that the closure indicator can slide on, and rotate about, the pin of the bracket of the first semi-cylindrical member, at least one of the first and second sidewalls further comprising an outwardly, transversely extending tab projecting toward the bracket of the second semi-cylindrical member, said elongate slot having a length such that the tab can extend below and beyond the pin of the bracket of the second semi-cylindrical member;
    a spring mounted on the pin of the bracket of the first semi-cylindrical member and coupled to the top plate, said spring:
      biasing the closure indicator rotationally in an open position; and
      biasing the closure indicator compressively so that the tab extends away from the pin of the bracket of the first semi-cylindrical member;
  wherein, when the locking mechanism is in a locked configuration, the closure indicator is adapted to be manually slid on the pin of the bracket of the first semi-cylindrical member against the compressive bias, manually rotated on the pin of the bracket of the first semi-cylindrical member against the rotational bias of the spring, and shifted to place the tab beneath the pin of the bracket of the second semi-cylindrical member.

2. The fluid coupling of claim 1, wherein the top plate further comprises a pair of curved projections extending from a rear edge.

* * * * *